United States Patent [19]
Landes et al.

[11] 3,958,733
[45] May 25, 1976

[54] METHOD FOR SIMULTANEOUSLY BREAKING A PLURALITY OF FRANGIBLE SHEETS

[75] Inventors: Raymond L. Landes, Perrysburg; Floyd F. Le Gros, Toledo, both of Ohio

[73] Assignee: Libbey-Owens-Ford Company, Toledo, Ohio

[22] Filed: Jan. 27, 1975

[21] Appl. No.: 544,424

Related U.S. Application Data

[62] Division of Ser. No. 391,887, Aug. 27, 1973, Pat. No. 3,883,056.

[52] U.S. Cl. .................................................. 225/2
[51] Int. Cl.² .......................................... B26F 3/00
[58] Field of Search .............. 225/2, 96.5, 103, 104, 225/105, 97, 96

[56] References Cited
UNITED STATES PATENTS 3,779,437  12/1973  Yamamoto ...................... 225/96.5

*Primary Examiner*—Othell M. Simpson
*Assistant Examiner*—Leon Gilden
*Attorney, Agent, or Firm*—Collins, Oberlin & Darr

[57] ABSTRACT

A method of and apparatus for simultaneously running the cuts on a plurality of frangible sheets, such as glass, which have been scored individually and stacked on their edges with their score lines in superimposed relation on a vertical storage buck in such a manner that the scored area is unsupported. The apparatus includes a press mechanism having a base frame within which the storage buck is selectively placed and a ram device connected to a carriage which is movably mounted on the base frame and which ram device is adapted to apply a force to the outer surface of the stack of frangible sheets at a line parallel to and closely spaced from the superimposed score lines of the stack to deflect and break the stack into two units on the buck.

Also, the bottom edges of the frangible sheets of the stack rest on supports arranged on each side of the score line and placed on the floor of the buck in such a manner that one of the units falls away from the other unit thereby opening a gap between their adjacent edges to prevent chipping thereof after the stack is broken.

6 Claims, 6 Drawing Figures

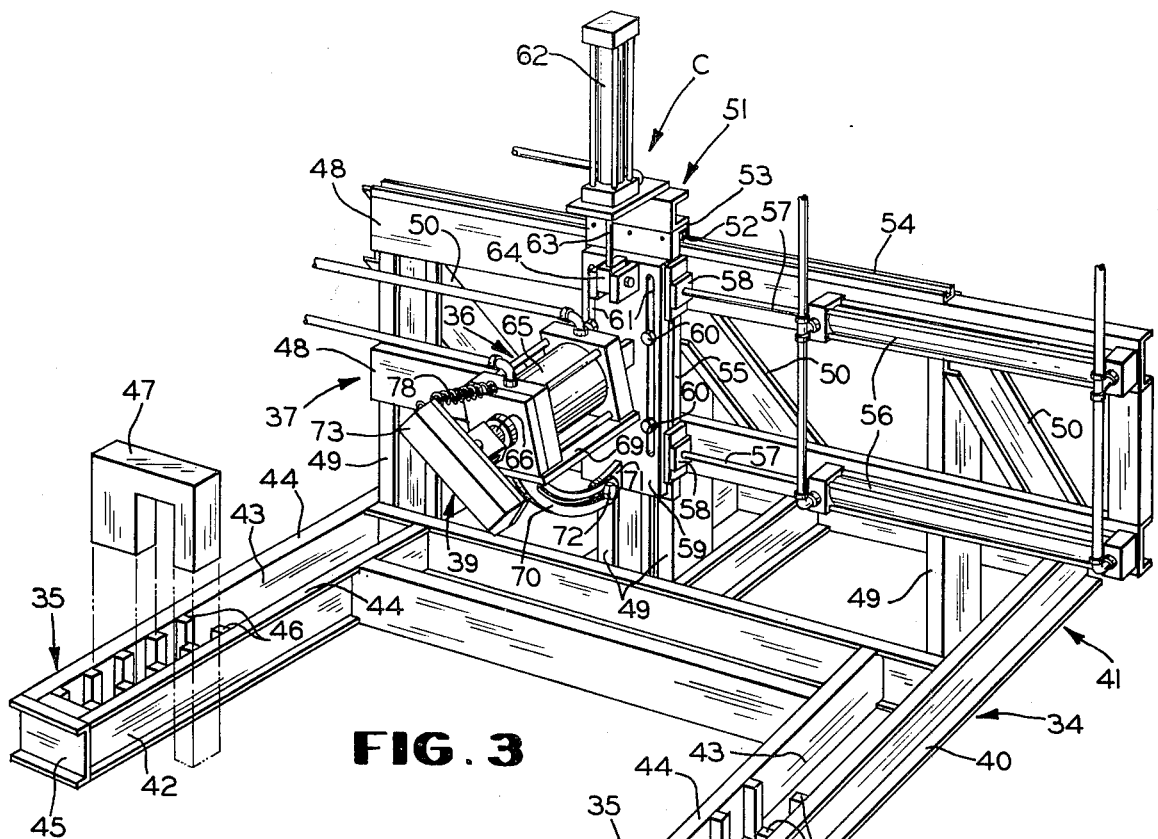
FIG. 3
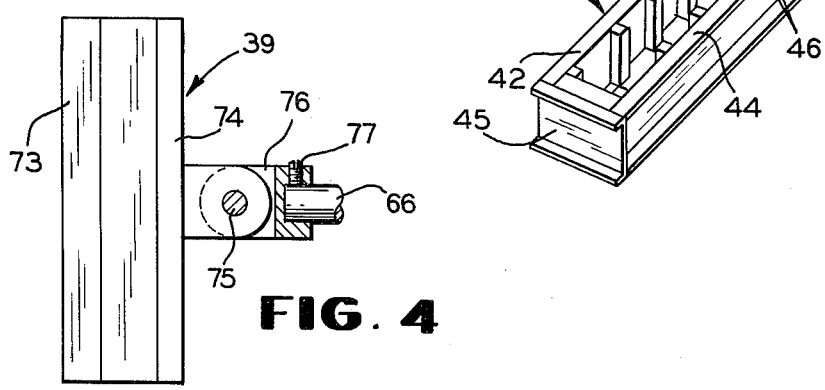
FIG. 4
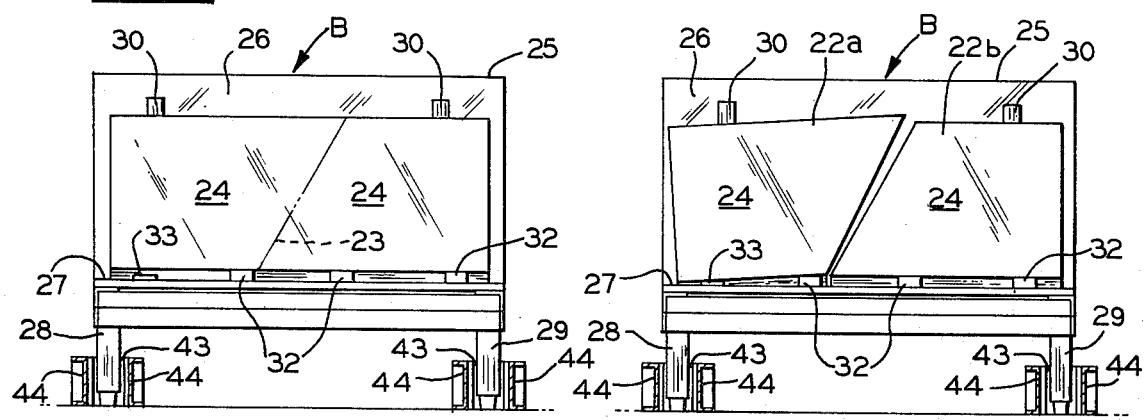
FIG. 5                    FIG. 6

METHOD FOR SIMULTANEOUSLY BREAKING A PLURALITY OF FRANGIBLE SHEETS

BACKGROUND OF THE INVENTION

This is a division of application Ser. No. 391,887, filed Aug. 27, 1973, now U.S. Pat. No. 3,883,056, issued May 13, 1975, 1. Field of the Invention The present invention relates to the art of breaking or running the cuts of scored frangible sheets, and more particularly to a method and apparatus for simultaneously breaking a plurality of stacked frangible sheets along a desired line into two units.

2. Description of the Prior Art

In fabricating articles from sheet glass on a high volume production basis such as encountered in producing glazing closures for automobiles, it is often necessary to remove large size sheets of glass from a production line to a storage area where groups of these sheets are normally vertically stacked on their edges on conventional storage and transport bucks. Heretofore, when these sheets were to be put back into a production line, they were individually removed from the storage buck and first put into a cutting line, scored, and their cuts run to form smaller blanks of predetermined size and shape. This individual handling of the large size sheets is slow and costly, as well as being hazardous.

SUMMARY OF THE INVENTION

The present invention, on the other hand, provides a method and apparatus for simultaneously breaking a plurality of previously scored glass sheets stacked on a vertical storage buck and, thus, eliminates the need for individually rehandling large size glass sheets oncey they have been removed from a production line.

Generally speaking, the method of this invention involves holding the stack of glass sheets with their score lines in superimposed relation and applying a compressive force at a line parallel to and a short distance from the score lines to break the stack into two units; while the apparatus comprises a conventional vertical storage buck, together with a press mechanism including means to hold the buck in opposed relation to a reciprocable ram.

OBJECTS AND ADVANTAGES

An object of this invention is to provide an improved method and apparatus for simultaneously breaking each of a plurality of large glass sheets into two smallelr units by stacking a plurality of previously scored sheets one against the other with their score lines in superimposed relation and breaking the sheets of the stack simultaneously along their superimposed score line by applying pressure to the unscored surfaces and permitting deflection of the scored surfaces of the sheets.

Another object of this invention is to provide a breaking apparatus which includes a standard storage buck upon which the scored sheets of glass are supported for deflection and which is positionable within a press mechanism in opposed relation to a ram device for breaking the glass sheets on the buck to eliminate individual handling of the large size sheets.

Yet another object is to provide in an apparatus of the above character, a power operated ram device for applying a breaking pressure to the stack of scored sheets to deflect and break the stack of sheets into two units.

A further object is to provide means for supporting the ram device adjacent the stack of scored glass sheets and for adjusting the position of the ram to break the glass sheets along desired lines.

Other objects and advantages will become more apparent during the course of the following description when taken in connection with the accompanying drawings.

BRIEF DESCRIPTION OF THE DRAWINGS

In the drawings, wherein like numerals are employed to designate like parts throughout the same:

FIG. 3 is a perspective view of the press mechanism employed in this invention;

FIG. 4 is a fragmentary cross sectional view showing means for attaching the breaking head to the piston rod of a double-acting power cylinder of the ram device employed in the press mechanism;

FIG. 5 is a view taken substantially along line 5—5 in FIG. 2 showing the relation between the stack of glass sheets and its co-operating storage buck; and FIG. 6 is view similar to FIG. 5 but showing the separated positions of the two units of glass blanks after the single stack of glass sheets has been broken.

DESCRIPTION OF THE PREFERRED EMBODIMENT

Figure 1:
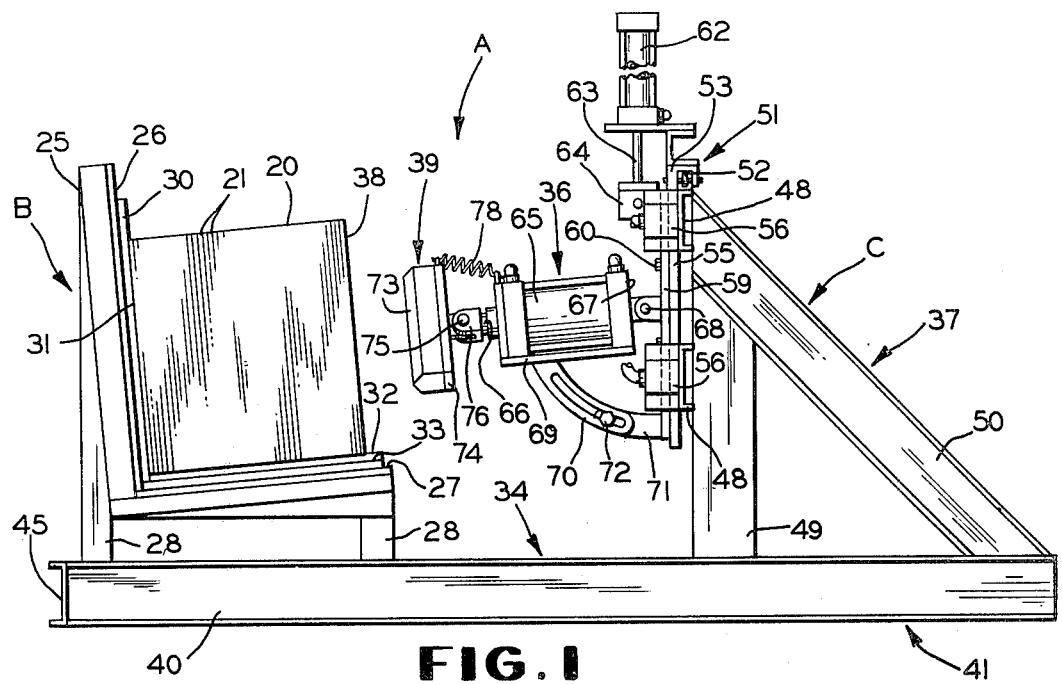
FIG. 1 is a side elevational view of a breaking apparatus constructed in accordance with this invention showing a storage buck loaded with a stack of glass within a press mechanism.
Figure 2:
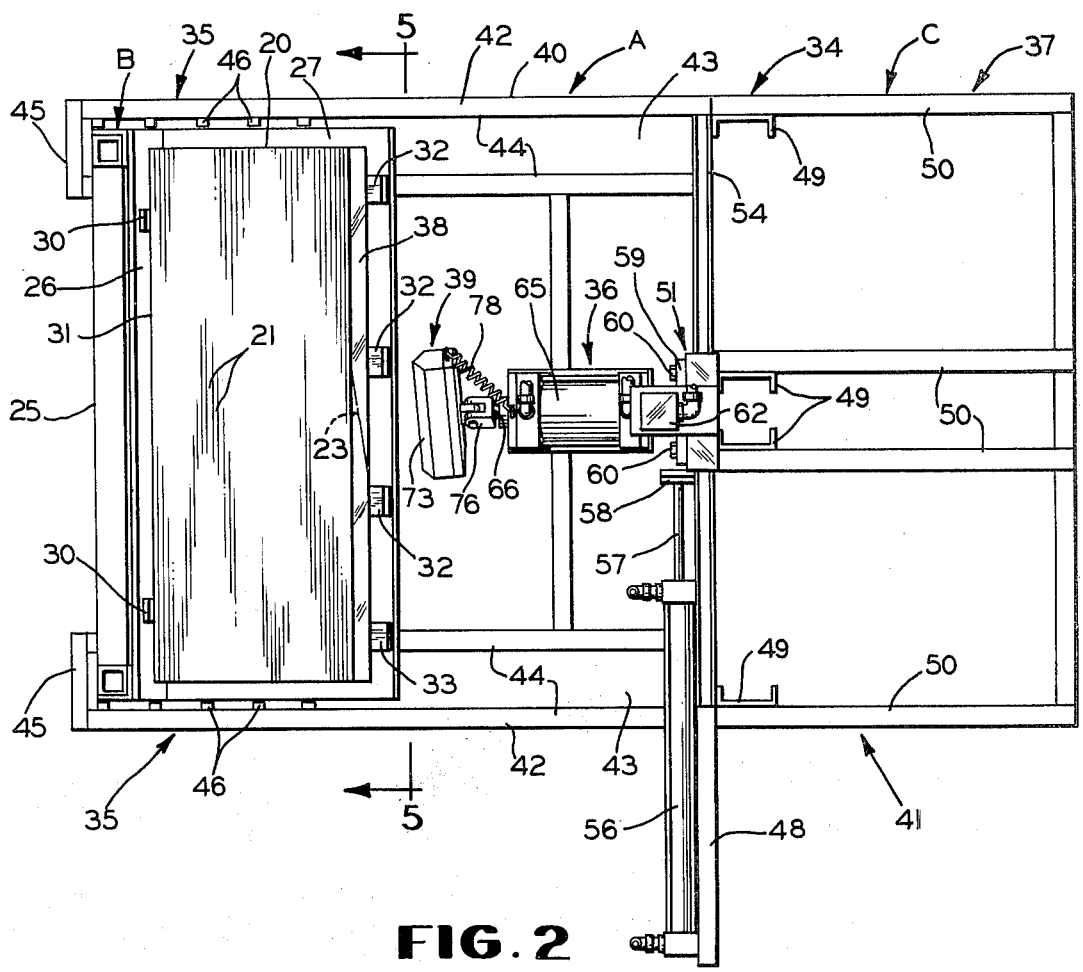
FIG. 2 is a plan view of the apparatus shown in FIG. 1.

Referring now to FIGS. 1 and 2, there is illustrated a preferred form of a breaking apparatus designated in its entirety by the letter A. As here shown, the breaking apparatus A includes broadly means B for supporting a stack 20 of individually scored glass sheets 21 and a press mechanism C for holding the supporting means B and breaking the stack 20 of glass sheets 21 into two similarly shaped units 22a and 22b (see FIG. 6).

By way of illustration, one stack 20 of glass sheets 21 which is adaptable to be broken into two units is shown in FIGS. 5 and 6. In this instance the sheets 21 each have been scored in a conventional manner as indicated by line 23 (see FIGS. 2 and 5) to produce pattern blanks 24 that are used in producing automobile side lights. As best seen in FIGS. 5 and 6, the blanks 24 are generally trapezoidal in shape and are formed by the score lines 23 which in this case enter the glass sheets 21 from their top edges, run diagonally across the sheets and leave at their bottom edges. It will be appreciated, however, that other shaped blanks having score line running in different directions can be broken with equal facility.

Thus, in accordance with this invention, the individual glass sheets 21 are first scored as indicated at 23 (see FIGS. 2 and 5) on a cutting line (not shown) and vertically stacked with their score lines 23 in superimposed relation and unsupported upon a conventional vertical storage buck 25, which constitutes the supporting means B, and which is positionable within the press mechanism C. The storage buck 25 includes an inclined L-shaped sheet supporting surface having an upright back wall 26 and a floor 27 supported by two pairs of side legs 28 and 29.

In order to render this method of breaking the stack 20 into two units 22a and 22b most effective, the stack 20 of glass sheets 21 is placed on the buck 25 with the scored surfaces of the sheets facing and spaced from the upright wall 26 of the L-shaped supporting surface. For this purpose, spacer members 30 are placed between the upright wall 26 of the buck 25 and the back surface 31 of the stack 20 along its upright marginal side edges to space the central portion of the stack from the wall 26. This permits the central portion of the stack 20 to deflect when placed under pressure so the sheets 21 of the stack break cleanly along their score lines 23 while on the buck 25.

Also in accordance with this invention, the bottom edges of the glass sheets 21 are coplanarly supported on three like elongated blocks 32 placed on the floor 27 of the buck 25 wherein two of the blocks 32 are spaced apart on one side of the score lines 23 to retain the unit 22b in its original position and the third block 32 is located on the other side of the score lines 23 closely adjacent thereto to permit the unit 22a to pivot therearound. A fourth block 33 of lesser height than the three supporting blocks 32 is located adjacent the outer marginal side edge of the bottom of the stack 20 on the same side of the score line as the one block 32. This arrangement permits the one unit 22a to fall away from the other unit 22b and rest on the block 32 (see FIG.6) after the stack 20 is broken to open a gap therebetween and thereby prevent chipping along their adjacent edges as the buck 25 is transported to another operation or a storage area. It will be appreciated, however, that other numbers and arrangements of blocks may be employed to attain the above described feature.

The press mechanism C employed in the breaking apparatus A generally comprises a welded skeletal framework 34 which includes means 35 for receiving and holding the storage buck 25 in selectively spaced positions opposite a ram device 36 connected to a superstructure 37 forming part of the skeletal framework 34. It will be appreciated that the front surface 38 of the stack 20 of the glass sheets 21 faces and is placed adjacent to the ram device 36 so that its breaking head 39 can apply a compressive force to the stack 20.

Referring now to FIG. 3, the skeletal framework 34 includes a horizontally disposed U-shaped base 40 having a rectangular frame portion 41 for supporting the superstructure 37, and a pair of spaced parallel arms 42 which extend from one side of the frame portion 41 and which constitute the buck receiving and holding means 35.

Still referring particularly to FIG. 3, the arms 42 for receiving and holding the buck 25 in selectively spaced positions relative to the ram device 36, each comprise an open top box section 43 including spaced apart upstanding side walls 44 and an end wall 45. The spacing between these side walls 44 is slightly greater than the width between the legs 28 and 29 of the buck 25 so that the legs may be received within the box sections 43. Also, it will be appreciated that the spacing between the longitudinally extending centerlines of the box sections 43 is equal to the spacing between the centers of the opposed side legs 28 and 29 of the buck 25. Thus, when the legs 28 and 29 of the buck 25 are placed within the box sections 43, the rear legs thereof contact the end walls 45 which hold the buck 25 in a stationary position when a breaking pressure is applied to the stack 20 by the ram device 36.

Since any number of glass sheets 21, depending upon the thickness of the individual sheets, may be stacked on the buck 25, the box sections 43 are provided with a plurality of longitudinally spaced pairs of transversely aligned vertical shoulders 46 along the inner surfaces of their side walls 44. A stop plate 47 is positionable within each box section 43 against the shoulders 46 to hold the buck closer to the ram device 36 when it is only partially loaded.

The superstructure 37, as illustrated in FIG. 3, includes a pair of vertically spaced, horizontally disposed beams 48 which are fixedly secured by a plurality of transversely spaced vertical posts 49 to the rectangular frame 41 in opposed relation to the buck holding means 35 so as to provide a reaction base for the ram device 36. These posts 49 are supported in their upright position by diagonally disposed braces 50 which extend between their upper ends and the frame 41.

It has been discovered that the stack 20 of glass sheets can best be broken into two units 22a and 22b when the breaking head 39 of the ram device 36 is positioned parallel to and spaced from the superimposed score lines 23 within a range of one-half to one and one-half inches therefrom and at the vertical center of this stack. Accordingly, a carriage 51 is provided for connecting the ram device 36 to the superstructure 37 and for positioning the ram device 36 relative to the superimposed score lines 23 of the stack 20.

Thus, the carriage 51 is supported for movement along a substantially horizontal rectilinear path by means of a pair of wheels 52 (only one shown) rotatably mounted between a U-shaped bracket 53 disposed at the top thereof. The wheels 52 are adapted to traverse a track 54 that is mounted on the top of the upper beam 48. The body 55 of the carriage 51 depends from the U-bracket 53 and its inner face rest against the outer faces of the beams 48. Although the carriage 51 may be moved in any well known manner, in the illustrated embodiment such movement is imparted by means of a pair of double-acting power cylinders 56 secured to the outer faces of the beams 48 forming part of the superstructure 37. The piston rods 57 thereof are connected to the side of the carriage 51 as at 58. Operation of the power cylinders 55 is controlled by conventional valves and switches (not shown).

In order to position the ram device 36 vertically, an anchor plate 59 is selectively attached to the outer face of the body 55 by bolts 60 passing through vertically extending slots 61 provided in the plate 59, the bolts being threadedly received in the body 55. Upward movement is imparted to the anchor plate 59 by means of a single-acting power cylinder 62 secured to the top of the carriage body 55. Its piston rod 63 is connected to the top of the anchor plate 59 as at 64. The weight of the plate 59 and its other appendages moves the plate downwardly when the pressure in the cylinder 62 is vented. Operation of this power cylinder 62 is controlled by conventional valves and switches (not shown).

The ram device 36 for applying a compressive force to the stack 20 of glass sheets 21 generally comprises a conventional double-acting power cylinder 65 which is connected to the anchor plate 59, and the breaking head 39 is mounted on the end of tis piston rod 66. Operation of this power cylinder 65 is controlled by suitable valves and switches (not shown) in a manner such that the pressure supplied to the cylinder 65 may be regulated whereby varying degrees of force may be applied by the breaking head to the stack 20 of glass sheets 21.

It has also been found that the stack 20 can be cleanly broken when the breaking pressure is applied perpendicularly thereto. Thus, since the stack 20 is supported on the buck 25 in an inclined position, the anchor end 67 of the power cylinder 65 is connected pivotally as at 68 to the anchor plate 59 so that its vertical angular position can be direced to bear perpendicularly to the inclined front surface 38 of the stack 20. To this end, the bottom side of the power cylinder 65 is provided with a support plate 69, the underside of which has affixed thereto one end of a slotted arcuate link 70. Another arcuate link 71 having one of its ends affixed to the anchor plate 59 projects outwardly therefrom in a position to cooperate with the slotted link 70. The projecting end of the link 71 threadably receives a bolt 72 passing through the slotted link 70 which, when tightened, locks and supports the power cylinder 65 in any preset vertical angular position.

In order to set the breaking head 39 parallel to and along a desired line such as score line 23, means is provided to selectively position it on the end of the piston rod 66. As best shown in FIG. 4, the breaking head 39 includes an elongated, V-shaped, resilient member 73 which may, for example, be made of wood. The member 73 is fastened to a support plate 74 connected pivotally by a pin 75 to a clevis 76 mounted on and secured to the end of the piston rod 66 by a locking screw 77. The screw 77, when released, permits the head 39 to be rotated to a position parallel to the score lines 23 of the sheets 21, and the pivotal connection assures that the head 39 will lie flat against the front surface 38 of the stack 20 so that the compressive force applied thereby will be evenly distributed along the surface of the stack 20. A helical tension spring 78 is connected between the head 39 and the cylinder 65 to retain the head 39 in substantially planar relation to the surface 38 of the stack 20 when it is not in contact therewith so that it will not inadvertently engage the stack in any other position than its operating position.

The operation of the glass breaking apparatus A will be best understood with particular reference to FIGS. 1, 2 and 6. The buck 25 containing a plurality of sheets of glass with their scored sides facing rearwardly, i.e., towards its back wall 26, is set in the box sections 43 with the rear ones of the side legs 28 and 29 against either the end walls 45 or the stop plates 47 of the press mechanism. The operator then advances the breaking head 39 against the front surface 38 of the stack 20 insuring that the head 39 is parallel to and within one-half to one and one-half inches of the superimposed score lines 23. Then depending upon the number and thickness of sheets contained in the stack 20 and the size of the power cylinder 65, which in this case is a 6" diameter cylinder, a pressure between approximately 70 to 100 p.s.i. is applied to the power cylinder 65 of the ram 36 until the center of the stack 20 deflects and it breaks into two units. As shown in FIG. 6, after the stack 20 is broken and the breaking head 39 has been backed off, the outer end of the one unit 22 drops down on the shorter block 33. The break between the two units is thus opened and a gap is provided so that the broken edges of the two units do not contact each other.

Practice has shown that a stack 20 containing over one hundred sheets 21 of glass having a thickness of ¼ inch has been successfully broken by this apparatus. However, in this case, the breaking of the stack 20 is accomplished in two stages. First, a pressure of about 70 p.s.i. is applied to the power cylinder 65 of the ram device 36 to break the stack 20 part way through, and then the pressure in the cylinder 65 is reduced to about 20 p.s.i. This permits the outer ends of the separated blanks 24 of the unit 22a to drop onto the block 33 as shown in FIG. 6. Next, a pressure of about 100 p.s.i is applied to the cylinder 65 to break the remaining unbroken sheets 21, and when the breaking head 39 is backed off the remainder of the now broken blanks 24a drops onto the block 33.

It is to be understood that the form of the invention herewith shown and described is to be taken as an illustrative embodiment only of the same and that various changes in the shape size and arrangement of the parts may be resorted to without departing from the spirit of the invention.

We claim:

1. In a method for simultaneously dividing a plurality of frangible sheets individually scored along a deisred line and stacked one against another with their score lines in superimposed relation into two units, the improvement comprising the steps of:
   a. supporting the stack of frangible sheets with said score lines in their superimposed relation and all facing in one direction, on opposite sides of the score lines so that the stack of sheets can deflect along the score lines; and
   b. applying a breaking force to said stack of frangible sheets in the opposite direction to said one direction along a line parallel to and closely spaced from said score lines to simultaneously deflect and break the stack of sheets into two units.

2. A method for simultaneously dividing a plurality of frangible sheets as claimed in claim 1, wherein said breaking force is applied within a range of about .5 to 1.5 inches from said score lines and substantially perpendicularly to the outer surface of said stack of frangible sheets.

3. A method for simultaneously dividing a plurality of frangible sheets as claimed in claim 1, including the step of separating the two units of the stack to prevent chipping of their adjacent edges.

4. In a method for breaking and separating a plurality of individually scored frangible sheets stacked one against another with their scored line in superimposed relation into two units comprising the steps of:
   a. supporting the stack of frangible sheets in their superimposed relation so that the stack can deflect at the score lines;
   b. applying an initial force at a line parallel to and spaced from said score lines to deflect and break some of the sheets in the stack;
   c. releasing the initial force;
   d. allowing the broken sheets to separate when the initial force is released;
   e. applying a second force at said line parallel to and spaced from the score line to deflect and break the balance of the sheets in the stack; and
   f. allowing the balance of the broken sheets to separate when said second force is released whereby the stack of frangible sheets is broken and separated into two units in two stages.

5. A method for breaking and separating a plurality of individually scored frangible sheets as claimed in claim 4, wherein said second force is of a larger magnitude than said initial force.

6. A method for dividing and separating a plurality of individually scored frangible sheets stacked vertically on their edges one against another with their score lines in superimposed relation into two units, comprising the steps of:
 a. holding the stack of scored frangible sheets with the score lines of the individual sheets in superimposed relation;
 b. supporting the stack of sheets at the rear adjacent its upright marginal side edges so that the scored portion of the stack can be deflected;
 c. applying a force to the stack of sheets at a line parallel to and spaced from the superimposed score lines to simultaneously deflect and break the sheets of the stack; and
 d. separating the two units of the stack to prevent chipping of their adjacent edges.

* * * * *